United States Patent Office 3,779,996
POLYAMIDEIMIDES FROM UNSATURATED
ANHYDRIDES
Denis R. Pauze, Scotia, N.Y., assignor to General
Electric Company, Schenectady, N.Y.
No Drawing. Continuation of abandoned application Ser.
No. 91,138, Nov. 19, 1970. This application Sept. 11,
1972, Ser. No. 288,223
Int. Cl. C08g 22/00
U.S. Cl. 260—77.5 AM                                   24 Claims

ABSTRACT OF THE DISCLOSURE

The properties of unsaturated anhydride chain-blocked polyamideimides containing free carboxyl and amine groups are improved by reacting with the uncured material polyisocyanate.

---

This is a continuation of application Ser. No. 91,138, filed Nov. 19, 1970 and now abandoned.

This invention relates to polyamideimides which have properties which make them useful for various types of high temperature insulation and coating applications. More particularly, the invention relates to unsaturated anhydride-blocked polyimides having unreacted carboxyl and amine groups which are reacted with polyisocyanate to provide an improved final cured material.

Chain-blocked polyamideimides of the above type can be prepared by first reacting a tricarboxylic acid-containing material with organic polyamine in a suitable solvent to provide an amideimide material which is then treated with an unsaturated anhydride and cured as by heating. However, there is a need for providing materials of the above type which will provide flexible films and other products having good high temperature and other physical characteristics, and it is accordingly a primary object of the present invention to provide such improved materials.

Those features of the present invention which are believed to be novel are set forth with particularity in the claims appended hereto. The invention will, however, be better understood and further objects and advantages thereof appreciated from a consideration of the following description.

Basically, the present invention provides new and improved polymers provided by reacting together a tricarboxylic material with organic polyamine or amine containing more than one amino group, adding to this material an unsaturated anhydride and then reacting with polyisocyanate and curing to achieve the desired improvement in physical characteristics.

While it is not desired to be bound as to any particular explanation for the improvement achieved by the present invention, it is believed that there are in the prior art materials described above unreacted groups such as carboxyl and amine groups which have a detrimental effect on the physical characteristics of the cured product. It is believed that the reaction of polyisocyanate with this material reacts with some or all of the unreacted groups to provide the improved qualities obtained.

Generally speaking, the tricarboxylic acid and polyamine are reacted in an inert solvent under a blanket of nitrogen to a reflux temperature which generally ranges from about 180° C. to 240° C. to the point where little or no water is evolved by azeotropic distillation or where carboxyl titration shows no decrease in carboxyl concentration or only a very slow decrease. The tricarboxylic acid material and polyamine can be used in stoichiometric amounts, the amine can be varied as desired up to about one mole or more in excess of such stoichiometric amount. After cooling to room temperature, the unsaturated anhydride is added in amount equivalent more or less to the amount of available free amine calculated. To this solution which also contains free carboxyl groups, the polyisocyanate is added and the mixture heated to a temperature ranging from about 60° C. to reflux temperature to facilitate reaction with any free acid as well as amine which may be present. The unsaturated anhydride and isocyanate can also be added together. Alternatively, the solution can be heated after addition of unsaturated anhydride to close the rings after which the isocyanate is added with heating.

While trimellitic anhydride is preferred as the tricarboxylic acid material, any of a number of suitable tricarboxylic acid constituents will occur to those skilled in the art including 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone-3,3',4-tricarboxylic anhydride; diphenyl isopropylidene - 3,3',4 - tricarboxylic anhydride; 3,4,10-preylene tricarboxylic anhydride; 3,4-dicarboxyphenyl 3-carboxyphenyl ether anhydride; ethylene tricarboxylic anhydride; 1,2,5 - naphthalene tricarboxylic anhydride; 1,2,4-butane tricarboxylic anhydride; etc. The tricarboxylic acid materials can be characterized by the following formula:

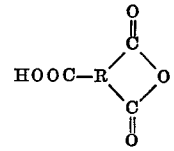

where R is a trivalent organic radical.

The aromatic polyamines useful in connection with the present invention are well known and may be expressed by the formula

where R' is an organic radical and $n$ is at least 2, and X is hydrogen, an amino group or organic group including those also containing at least one amino group. Among the specific amines useful for the present invention, alone or in admixture, are the following:

4,4-diamino-2,2'-sulfonediphenylmethane
ethylenediamine
benzoguanamine
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene para-bis(1,1-dimethyl-5-amino-pentyl)benzene
m-xylylene diamine
p-xylylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
polymethylene polyamine (Curithane)
and mixtures thereof.

Among the unsaturated anhydrides which are useful in connection with the present invention are substituted and unsubstituted maleic anhydrides, itaconic anhydride, citraconic anhydride, and endo-cis-5-norbornene-2,3-dicarboxylic anhydride, the methyl-substituted material, tetrahydrophthalic anhydride. Such anhydrides can be expressed by the formula

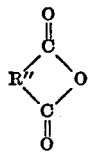

where R″ is a divalent, aliphatically unsaturated organic radical or one containing a carbon-carbon double bond. Others will occur to those skilled in the art.

Any polyisocyanate, that is, any isocyanate such as R‴(NCO)$_y$, having two or more isocyanate groups, whether blocked or unblocked, can be used. In the above formula R‴ is an organic radical and $y$ is at least 2. Blocked isocyanates using as the blocking constituent phenols or alcohols or complexed isocyanates can be used and in general provide a higher molecular weight final material which is advantageous as, for example, in varnishes. On the other hand, the unblocked isocyanates provide more flexible final materials. At any rate, the blocking material must be evaporated off as much as possible and there is no advantage from the reaction point of view to using the blocked material except as stated above. Typical of the blocked polyisocyanates is Mondur S wherein mixtures 2,4- and 2,6-tolylene diisocyanate are reacted with trimethylol propane and blocked by esterification with phenol in the proportions of three moles of isocyanate, one mole of trimethylol propane, and three moles of phenol. In Mondur SH, the isocyanate groups of mixed 2,4- and 2,6-tolylene diisocyanate are blocked by esterification with cresol or phenol, for example. Among the polyisocyanates which are useful alone or in admixture are the following:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate
3,3'-dimethoxy-4,4'-biphenylenediisocyanate
3,3'-diethoxy-4,4-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphtylenediisocyanate
1,4-naphthylenediisocyanate
4,4',4″-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylene polyphenylisocyanate Generally speaking, the organic solvents used for preparing the present materials are polar organic solvents typified by n-methylpyrrolidone (MP), pyridinedimethyl sulfone, dimethylacetamide tetramethylene sulfone, tetramethyl urea, dimethyl sulfoxide, dimethyl formamide, all of which are unreactive under reaction conditions with the other ingredients. Up to one hundred percent cresol can be used. If desired, the above solvents can be diluted with up to 40 percent by weight of high boiling petroleum fractions such as the Solvesso materials, various ketones typified by methylethyl ketone, alcohols, and the like.

While for some applications it is preferred from the point of view of the characteristics of the final product obtained to use tricarboxylic materials such as trimellitic anhydride and the like, the original carboxylic reactants can as well be in part or in whole an aromatic dicarboxylic acid or anhydride typified by the terephthalic and isophthalic materials and benzophenone dianhydride, among others. Furthermore, up to 80 percent of such dicarboxylic material can be substituted by aliphatic dicarboxylic materials such as adipic, sebacic, azelaic, suberic, pimelic, oxalic, maleic, succinic, glutaric and dodecanedioc and fumaric acids.

While aromatic polyamines are preferred, aliphatic polyamines can be used where the lower temperature characteristics along with improved flexibility are indicated.

The following examples will illustrate the practice of the present invention, it being realized that they are not to be taken as limiting in any way.

EXAMPLE 1

In a flask under nitrogen equipped with a Vigreux column, Dean-Stark trap and condenser, stirrer, and thermometer, there were placed 380 g. N-methyl pyrrolidone (MP) and 594 g. (3 moles) p,p-methylenedianiline.

The contents were heated to solution and 518.4 g. (2.7 moles) trimellitic anhydride added along with 40 g. of xylene. After heating at about 215° C. for 7 hours with collection of water, a viscous solution was obtained, there being added at this point an additional 1135 g. of MP. The carboxyl content was 2.46%. The solution was allowed to cool to about room temperature and 58.8 g. (0.6 mole) maleic anhydride slowly added, stirred and then heated to 90° C. at which point a 6.7 g. portion of 2.4 tolylene diisocyanate was added. The resultant gelling was broken up by heating at about 200° C. for about one hour. The remaining 46.8 g. of isocyanate were added at a temperature of 110° C. with evolution of carbon dioxide. A free film cast on an aluminum panel from this material and cured at 100° C. and 150° C. each for one hour, 200° C. for one hour, and 250° C. for one hour was clear and tough and bent 180° C. without failing. On the other hand, a similar example prepared without the isocyanate failed when bent 180° C. as above.

When a polyesterimide coated magnet wire helical coil was treated with the product of this example, to a thickness of about four to five mils, the bond strength ranged from about 55 pounds at 25° C. to about 12 pounds at 180° C.

EXAMPLE 2

To a jar there were added 765 g. (56% solids) of the product of Example 1 along with 9.3 g. diallylisophthalate and 380 g. of 1:1 by volume dimethylformamide-xylene solution. A panel dipped in the stirred material drained for one-half hour and cured at temperatures of 100° C. and 150° C. for one hour each had a copolymeric film with good wetting characteristics and good flexibility which resisted creasing by a 1/8 inch diameter mandrel.

EXAMPLE 3

A flask equipped as in Example 1 was charged with 768 g. (4.0 moles) trimellitic anhydride, 798 g. (4 moles) methylene dianiline, 668 g. MP and 40 g. of xylene. The contents were heated as in Example 1 for about 5 hours to a carboxyl content of 3.3%, there being added to the final mixture a total of 7380 g. of N-methylpyrrolidone.

500 g. of the above material were added to 19.47 g. (0.11 mole) endo-cis-5-norbornene-2,3-dicarboxylic anhydride; then small aliquots of a total of 19.25 g. of 2,4-toluenediisocyanate were added over a period of 3 hours during which the temperature was gradually increased to 140° C. At this point an additional 560 cc. of MP solvent was added. A panel dipped in the material, dried, and cured as in Example 2 had a clear, flexible coating which passed the above described mandrel bend test.

EXAMPLE 4

Example 3 was repeated except that 16.72 g. (0.11 mole) of tetrahydrophthalic anhydride were used in place of the norbornene material and a total amount of 32.6 g. of 2,4-toluene diisocyanate was used. A stainless steel panel as above dipped into this solution, removed at 4"/minute, allowed to drip until tacky and then cured at 100° C., 150° C., 200° C. for one hour each and 300° C. for 15 minutes passed the above mandrel test.

EXAMPLE 5

In a flask equipped as in Example 1 there were placed 768 g. (4.0 moles) trimellitic anhydride, 792 g. (4.0 moles) methylenedianiline, 668 g. MP solvent and 40 g. xylene. The contents were heated for about 7 hours at about 220° C. to a free carboxyl content of 2.7%. There were then added to the solution 900 g. dimethylformamide (DMF) and 1150 g. of xylene. After cooling to room temperature there were added 83.3 g. (0.85 mole) maleic anhydride, the contents being stirred and allowed to react. Then 172.5 g. of 2,4-toluenediisocyanate were added in small portions over about a ten-hour period. Sixty g. of propanol were added, the final material having a viscosity of 2480 centipoises at 32% solids. The resultant material was tested in accordance with IEEE Test No. 57 as an overcoat over commercial polyamideimide and polyesterimide undercoats on magnet wire. The thermal endurance rating at 40,000 hours was 213° C. in each of the two tests. This example shows the good solubility of the amide-imide in a solvent system having relatively high hydrocarbon content which is further stabilized by blocking any free isocyanate with alcohol.

EXAMPLE 6

A flask equipped as in Example 1 was charged with 240 g. MP, 297 g. (1.5 moles) methylene dianiline, 259.2 g. of (1.35 moles) trimellitic anhydride and 40 g. xylene. The ingredients were heated to a temperature of 210° C. until the theoretical amount of water for a complete reaction was collected, the contents then being diluted with more MP solvent to a concentration of about 30% solids. There were added to the room temperature solution 39.2 g. (0.40 mole) maleic anhydride, the contents being further stirred and an additional 120 cc. of MP solvent added.

To 333 g. of the resulting solution there was added a total of 16 g. of p,p'-diphenylmethanediisocyanate over a period of 4 hours at a temperature of from about 90° C. to 140° C. A sample of the above material cured on a hot plate at 220° C. for one hour formed a tough, flexible film.

EXAMPLE 7

To a flask equipped as in Example 1 there were added 768 g. (4 moles) trimellitic anhydride, 792 g. (4.0 moles) methylenedianiline along with 668 g. M.P. solvent and 40 g. xylene, the contents being heated at about 220° C. to a carboxyl content of 3.5% and a solids content of about 45.3%. To this solution there were added 108 g. (1.1 moles) maleic anhydride, the contents being stirred and allowed to react. To this reactant mixture there were added at 50° C., 60 g. of 2,4-toluene diisocyanate, the contents being allowed to react overnight. The resultant viscous solution was diluted to 30.8% solids with M.P. To this solution there were added 60 g. of propanol, the contents and the material precipitated by addition into a blender containing water, the precipitant being washed with ether and dried. Powder so obtained was dissolved in dimethylformamide to a viscosity of 33 seconds in a No. 2 Zahn cup. The amber colored solution was pigmented and sprayed on a clean aluminum panel and cured at 100° C., 200° C. and 302° C. each for 15 minutes to provide a clear, greenish colored film which passed a 50-pound impact test.

EXAMPLE 8

A flask equipped as in Example 1 was charged with 248 g. (1 mole) diaminodiphenylsulfone, 192 g. (1.0 mole) trimellitic anhydride, 167 g. N-methylpyrrolidone and 40 g. of xylene, the contents being heated to about 220° C. for about 15 hours to a carboxyl content of about 3.2%. The contents were then diluted with an additional 650 g. M.P. solvent, 28.4 g. (0.29 mole) maleic anhydride being added to the room temperature solution with stirring for one hour. The solution was then heated to 180° C. for one hour with evolution of theoretical water. There were added at 70° C., 15 g. of 2,4-toluenediisocyanate over a period of 6 hours, a temperature of 145° C. being attained. To this solution there were added 66 g. of Mondur SH. A film prepared on a metal panel and cured at 180° C., 200° C., and 250° C., all for one hour, was clear, tough, infusible and flexible.

There are provided by this invention unsaturated anhydride, chain-blocked polyamideimides in which during preparation some or all of any free amine or carboxyl groups produced are reacted with polyisocyanate to produce in the cured material good high temperature properties. As illustrated above, the products are useful as wire enamels, paints and varnishes and for the preparation of flexible films. They are also useful as adhesives and impregnants for fibrous and other bases such as of micaceous material in the making of composites. They can also be precipitated out and used in well-known manner in molding and other applications.

What I claim as new and desire to secure by Letters Patent of the United States is:

1. The polyamideimide product comprising the reaction product of (a) the reaction product of tricarboxylic acid material having the formula

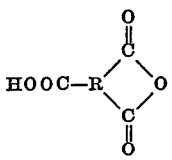

where R is a trivalent organic radical and polyamine having the formula

where R' is an organic radical and $n$ is at least 2, and X is hydrogen, an amino group or organic group including those containing at least one amino group, (b) aliphatically unsaturated anhydride having the formula

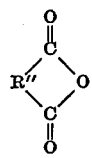

where R" is selected from divalent, aliphatically unsaturated organic radicals and divalent radicals containing a carbon-carbon double bond, and (c) polyisocyanate having the formula

where R''' is an organic radical and $y$ is at least 2.

2. The product of claim 1 where the tricarboxylic acid material is trimellitic anhydride.

3. The product of claim 1 where the aliphatically unsaturated anhydride is selected from substituted and unsubstituted maleic anhydride, itaconic anhydride, citraconic anhydride, endo-cis-5-norbornene-2,3-dicarboxylic anhydride, tetrahydrophthalic anhydride, and mixtures thereof.

4. A product as in claim 1 where a portion of said tricarboxylic acid material is replaced by dicarboxylic acid material.

5. A product as in claim 1 where said tricarboxylic acid material is trimellitic anhydride, said polyamine is methylene dianiline, said aliphatically unsaturated anhydride is endo-cis-5-norbornene-2,3-dicarboxylic anhydride and said polyisocyanate is 2,4-tolylene diisocyanate.

6. A product as in claim 5 where said aliphatically unsaturated anhydride is tetrahydrophthalic anhydride.

7. A product as in claim 1 wherein said aliphatically unsaturated anhydride is maleic anhydride.

8. The cured product of claim 1.

9. An electrical conductor coated with the cured product of claim 1.

10. A base material impregnated with the product of claim 1.

11. A film prepared from the product of claim 1.

12. The product of claim 1 which is copolymerized with other unsaturated monomer material.

13. The product of claim 1 wherein said aliphatically unsaturated anhydride is reacted with the reaction product of said tricarboxylic acid and polyamine before said polyisocyanate is added.

14. The product of claim 13 where the tricarboxylic acid material is trimellitic anhydride.

15. The product of claim 13 where the aliphatically unsaturated anhydride is selected from substituted and unsubstituted maleic anhydride, itaconic anhydride, citraconic anhydride, endo-cis-5-norbornene-2,3-dicarboxylic anhydride, tetrahydrophthalic anhydride, and mixtures thereof.

16. A product as in claim 13 where a portion of said tricarboxylic acid material is replaced by dicarboxylic acid material.

17. A product as in claim 13 where said tricarboxylic acid material is trimellitic anhydride, said polyamine is methylene dianiline, said aliphatically unsaturated anhydride is endo-cis-5-norbornene-2,3-dicarboxylic anhydride and said polyisocyanate is 2,4-tolylene diisocyanate.

18. A product as in claim 17 where said aliphatically unsaturated anhydride is tetrahydrophthalic anhydride.

19. A product as in claim 13 where said aliphatically unsaturated anhydride is maleic anhydride.

20. The cured product of claim 13.

21. An electrical conductor coated with the cured product of claim 13.

22. A base material impregnated with the product of claim 13.

23. A film prepared from the product of claim 13.

24. The product of claim 13 which is copolymerized with other unsaturated monomer material.

References Cited
UNITED STATES PATENTS
3,562,189   2/1971   Farrissey et al. ____ 260—30.6 R MAURICE J. WELSH, Primary Examiner U.S. Cl. X.R.
117—128.4